(12) United States Patent
Kim et al.

(10) Patent No.: US 9,709,334 B2
(45) Date of Patent: Jul. 18, 2017

(54) HEAT TREATMENT CONTAINER FOR VACUUM HEAT TREATMENT APPARATUS

(75) Inventors: Byung Sook Kim, Seoul (KR); Min Sung Kim, Seoul (KR); Kyoung Hoon Chai, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 972 days.

(21) Appl. No.: 13/519,050

(22) PCT Filed: Dec. 24, 2010

(86) PCT No.: PCT/KR2010/009335
§ 371 (c)(1),
(2), (4) Date: Dec. 21, 2012

(87) PCT Pub. No.: WO2011/078628
PCT Pub. Date: Jun. 30, 2011

(65) Prior Publication Data
US 2013/0095442 A1    Apr. 18, 2013

(30) Foreign Application Priority Data

Dec. 24, 2009   (KR) .................. 10-2009-0130663
Dec. 6, 2010    (KR) .................. 10-2010-0123882

(51) Int. Cl.
| | |
|---|---|
| *F27D 7/06* | (2006.01) |
| *C01B 31/36* | (2006.01) |
| *F27B 5/04* | (2006.01) |
| *F27B 5/16* | (2006.01) |

(52) U.S. Cl.
CPC .............. *F27D 7/06* (2013.01); *C01B 31/36* (2013.01); *F27B 5/04* (2013.01); *F27B 5/16* (2013.01)

(58) Field of Classification Search
CPC ... C01B 31/36; F27D 7/06; F27B 5/16; F27B 5/04; C23C 16/4488
USPC ................. 432/200, 205; 220/4.11, 676, 661
See application file for complete search history.

(56) References Cited

U.S. PATENT DOCUMENTS

| | | | | |
|---|---|---|---|---|
| 4,610,864 A | * | 9/1986 | Kuramoto et al. .......... | 423/344 |
| 5,384,173 A | * | 1/1995 | Akao et al. ................. | 428/35.7 |
| 5,439,525 A | * | 8/1995 | Peichl et al. ................ | 118/726 |
| 6,246,029 B1 | * | 6/2001 | Addis ......................... | 219/390 |
| 2002/0182558 A1 | | 12/2002 | Bollwahn et al. | |

(Continued)

FOREIGN PATENT DOCUMENTS

| | | |
|---|---|---|
| CN | 86201813 U | 12/1986 |
| CN | 1298957 A | 6/2001 |

(Continued)

OTHER PUBLICATIONS

Office Action dated Nov. 19, 2013 in Japanese Application No. 2012-545863.

(Continued)

*Primary Examiner* — Steven B McAllister
*Assistant Examiner* — Steven Anderson, II
(74) *Attorney, Agent, or Firm* — Saliwanchik, Lloyd & Eisenschenk

(57) ABSTRACT

Provided is a heat treatment container for a vacuum heat treatment apparatus. The heat treatment container includes a bottom and a sidewall. An exhaust passage is defined in an upper portion of the sidewall.

15 Claims, 5 Drawing Sheets

(56) References Cited

U.S. PATENT DOCUMENTS

| | | | |
|---|---|---|---|
| 2003/0047141 A1* | 3/2003 | Warnes | C23C 16/4488 118/726 |
| 2008/0072817 A1* | 3/2008 | Zwieback et al. | 117/84 |
| 2008/0280553 A1* | 11/2008 | Reynard | 454/251 |
| 2010/0012035 A1 | 1/2010 | Nagata | |
| 2010/0186422 A1* | 7/2010 | Yang et al. | 62/3.3 |
| 2011/0146575 A1* | 6/2011 | Choi et al. | 118/721 |
| 2011/0244267 A1 | 10/2011 | Takeda | |

FOREIGN PATENT DOCUMENTS

| | | |
|---|---|---|
| CN | 101512036 A | 8/2009 |
| JP | 43-007173 | 3/1968 |
| JP | 02-103700 | 8/1990 |
| JP | 03-258458 A | 11/1991 |
| JP | 05-033078 | 2/1993 |
| JP | 05-203369 * | 8/1993 |
| JP | 06-034278 | 2/1994 |
| JP | 08-245269 | 9/1996 |
| JP | 09-089469 | 4/1997 |
| JP | 2008-024991 A | 2/2008 |
| JP | 2008074653 A | 4/2008 |
| JP | 2008143748 A | 6/2008 |
| JP | 2010-132518 A | 6/2010 |
| KR | 10-1999-006325 A | 1/1999 |

OTHER PUBLICATIONS

Chinese Office Action dated Dec. 26, 2013 in Chinese Application No. 201080064803.3.
International Search Report in International Application No. PCT/KR2010/009335, filed Dec. 24, 2010.
Office Action dated Jul. 31, 2012 in Korean Application No. 10-2010-0123882, filed Dec. 6, 2010.
Office Action dated Dec. 24, 2009 in Korean Application No. 1020090130663.

* cited by examiner

HEAT TREATMENT CONTAINER FOR VACUUM HEAT TREATMENT APPARATUS

CROSS-REFERENCE TO RELATED APPLICATIONS

This application is the U.S. national stage application of International Patent Application No. PCT/KR2010/009335, filed Dec. 24, 2010, which claims priority to Korean Application Nos. 10-2009-0130663, filed Dec. 24, 2009, and 10-2010-0123882, filed Dec. 6, 2010, the disclosures of each of which are incorporated herein by reference in their entirety.

TECHNICAL FIELD

The present disclosure relates to a heat treatment container for a vacuum heat treatment apparatus.

BACKGROUND ART

A vacuum heat treatment apparatus is an apparatus in a raw material is thermally treated within a furnace to manufacture a desired material. The vacuum heat treatment apparatus has an advantage in that heat treatment is performed in a vacuum state to prevent a material to be manufactured from being contaminated from surrounding substances. In the vacuum heat treatment apparatus, an insulating member is disposed inside a chamber having a vacuum state and a heater is disposed within the insulating member to heat a raw material.

According to the vacuum heat treatment apparatus, a gas generated during reaction and an unreacted gas may not be uniformly discharged, a material manufactured in the vacuum heat treatment apparatus may be deteriorated in quality, and a recovery rate of the manufactured material may be reduced. In addition, when a gas is not uniformly discharged into the vacuum heat treatment apparatus, particle sizes of the manufactured material may not be uniform.

DISCLOSURE OF INVENTION

Technical Problem

Embodiments provide a heat treatment container for a vacuum heat treatment apparatus in which a reaction gas and unreacted gas are uniformly discharged.

Solution to Problem

In one embodiment, a heat treatment container for a vacuum heat treatment apparatus includes: a bottom; and a sidewall, wherein an exhaust passage is defined in the sidewall.

The exhaust passage may include an upper exhaust passage defined in an upper portion of the sidewall.

The upper exhaust passage may have one shape of a rectangular shape, an inverted triangular shape, a semicircular shape, an inverted trapezoid shape, and a circular shape.

The upper exhaust passage may be defined between a height corresponding to about 90% from the bottom and a height corresponding to about 100% from the bottom.

A connection portion between the upper exhaust passage and the sidewall may be rounded.

The heat treatment container may have a space therein and one opened side and may further include a cover member covering therearound, wherein the upper exhaust passage may be defined at a portion of the heat treatment container adjacent to the cover member.

The exhaust passage may include a lower exhaust passage defined in a lower portion of the sidewall.

A porous member may be disposed inside the heat treatment container.

The porous member may be disposed at a lower portion of the heat treatment container.

The porous member may be disposed to block the lower exhaust passage.

The porous member may have a thickness equal to or thicker than that of the lower exhaust passage.

The porous member may include graphite.

The heat treatment container may further include a cover member covering therearound, and the upper exhaust passage may be defined at a portion of the heat treatment container adjacent to the cover member.

The upper exhaust passage and the lower exhaust passage may be disposed at positions corresponding to each other.

The heat treatment container may be provided in plurality, wherein the plurality of heat treatment containers may further include an outside member at the outside thereof to surround the plurality of heat treatment containers.

The heat treatment container may have a polygonal plane shape or a rounded plane shape.

The heat treatment container may be used for manufacturing silicon carbide.

The details of one or more embodiments are set forth in the accompanying drawings and the description below. Other features will be apparent from the description and drawings, and from the claims.

Advantageous Effects of Invention

In the vacuum heat treatment apparatus according to the embodiments, the upper exhaust passage may be defined in the heat treatment container to discharge the gases. Thus, the gas flow may be smooth to improve the quality and recovery rate of the manufactured material.

In the vacuum heat treatment apparatus according to the embodiments, the lower exhaust passage may be defined in the heat treatment container to discharge the gases through the lower portion of the heat treatment container. Thus, the gas flow may be smooth to improve the quality of the manufactured material.

Here, the porous member may block the lower exhaust passage to prevent the raw material within the heat treatment container from leaking and realize the smooth gas flow.

The lower exhaust passage and the upper exhaust passage may be disposed at the positions corresponding to each other to uniformly discharge the gases through the upper and lower portions of the heat treatment container. Thus, the material having the uniform particle sizes may be manufactured.

MODE FOR THE INVENTION

Figure 1:
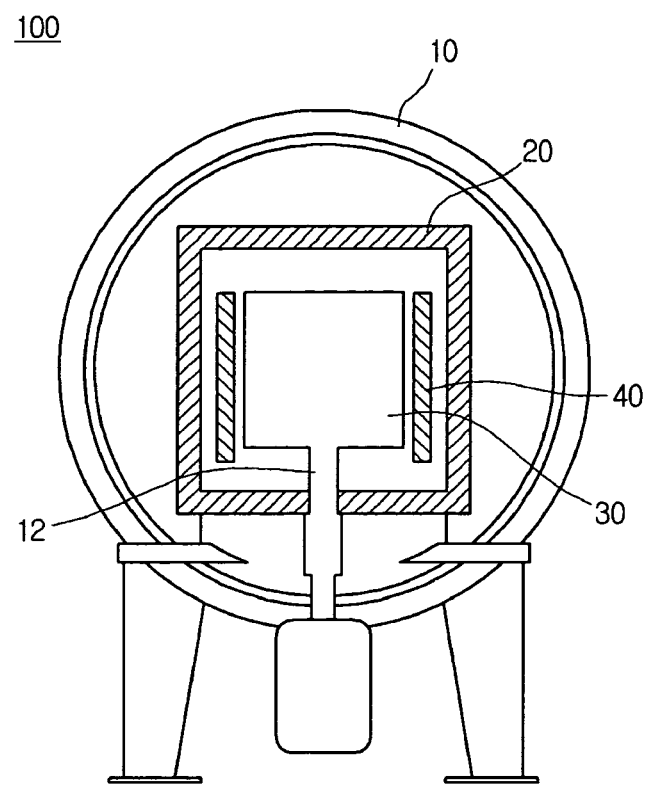
FIG. 1 is a schematic view of a vacuum heat treatment apparatus according to an embodiment.

In the descriptions of embodiments, it will be understood that when a layer (or film), a region, a pattern, or a structure is referred to as being 'on' a substrate, a layer (or film), a region, a pad, or patterns, it can be directly on another layer or substrate, or intervening layers may also be present.

In the drawings, the thickness or size of each layer is exaggerated, omitted, or schematically illustrated for convenience in description and clarity. Also, the size of each element does not entirely reflect an actual size.

Reference will now be made in detail to the embodiments of the present disclosure, examples of which are illustrated in the accompanying drawings.

FIG. 1 is a schematic view of a vacuum heat treatment apparatus according to an embodiment.

Referring to FIG. 1, a vacuum heat treatment apparatus 100 according to an embodiment includes a chamber 10, an insulating member 20 disposed inside the chamber 10, and a heat treatment container part 30 disposed within the insulating member 20, and a healing member 40. The above-described components will be described below.

An atmosphere gas is injected into the chamber 10 through an atmosphere gas supply pipe (not shown). An inert gas such as argon or helium may be used as the atmosphere gas.

The insulating member 20 disposed inside the chamber 10 thermally insulates the heat treatment container part 30 to allow the heat treatment container part 30 to be maintained at an adequate temperature for reacting. The insulating member 20 may contain graphite to bear at a high temperature.

The heat treatment container part 30 in which raw materials are filled to generate a desired material through reaction between the raw materials is disposed within the insulating member 20. The heat treatment container part 30 may contain graphite to bear at a high temperature. A gas generated during the reaction or unreacted gas may be discharged through an exhaust hole 12 connected to the heat treatment container part 30.

The heating member 40 for heating the heat treatment container part 30 is disposed between the insulating member 20 and the heat treatment container part 30. The heating member 40 may supply heat to the heat treatment container part 30 through various methods. For example, the heating member 40 applies a voltage to the graphite to generate heat.

Figure 2:
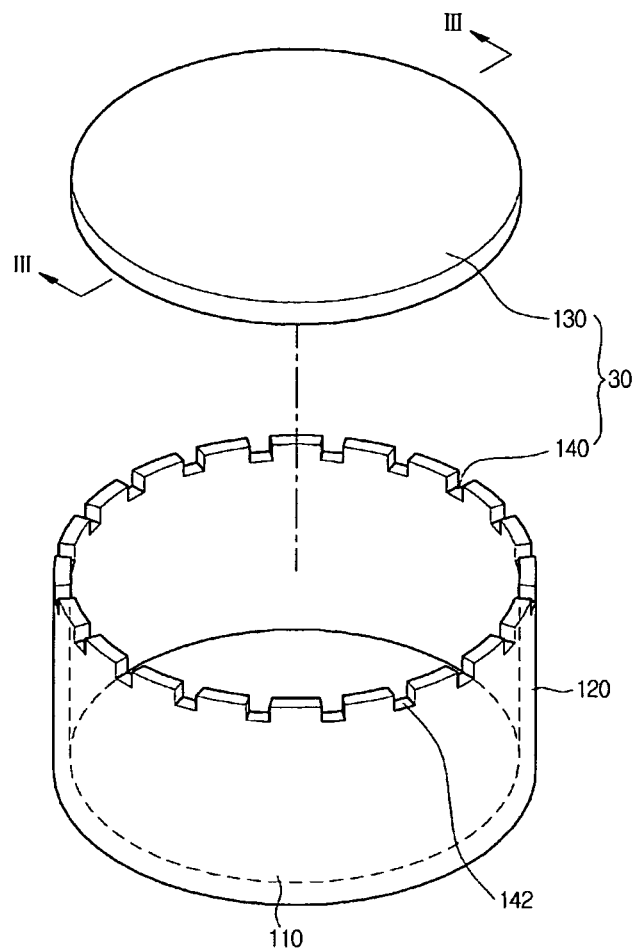
FIG. 2 is a perspective view of a heat treatment container part according to a first embodiment.

The heat treatment container part 30 of the heat treatment apparatus 100 may be a furnace, which receives raw materials and applies heat to the raw materials to manufacture a desired material. The heat treatment container part 30 will be described with reference to FIGS. 2 and 3. FIG. 2 is a perspective view of a heat treatment container part according to a first embodiment, and FIG. 3 is a sectional view taken along line III-III of FIG. 2.

Figure 3:
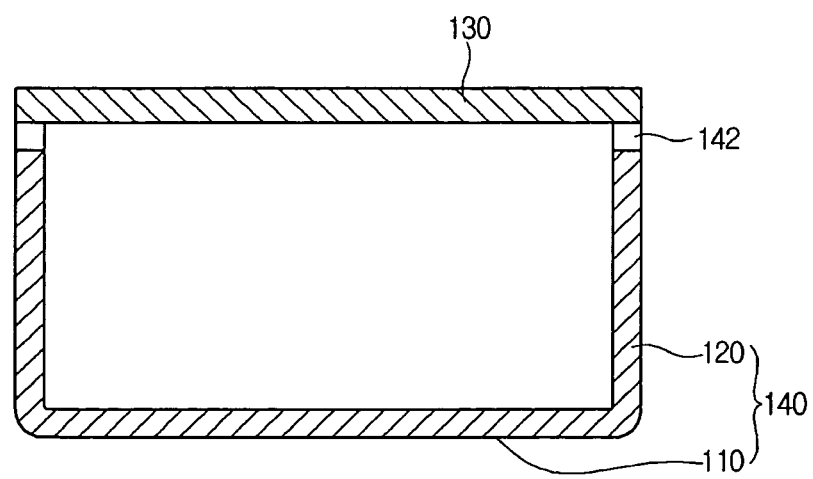
FIG. 3 is a sectional view taken along line III-III of FIG. 2.

Referring to FIGS. 2 and 3, the heat treatment container part 30 may include a heat treatment container 140 having a space therein and one opened side and a cover member 130 covering the heat treatment container 140. The heat treatment container part 30 may be formed of a material bearing at a high temperature, e.g., graphite.

The heat treatment container 140 has a bottom 110 and a sidewall 120, which are integrated with each other. Also, the heat treatment container 140 has a space in which raw materials are filled therein. An exhaust passage 142 may be defined in an upper portion of the sidewall 120 of the heat treatment container 140, i.e., a portion adjacent to the cover member 130 of the heat treatment container 140. The reaction gas generated during the heat treatment or the unreacted gas may be disposed through the exhaust passage 142.

The exhaust passage 142 may be defined between a height corresponding to about 90% from the bottom and a height corresponding to about 100% from the bottom. Thus, the filled raw materials may be prevented from leaking to the outside, and also the gases may be smoothly discharged. As shown in FIGS. 2 and 3, when the exhaust passage 142 is defined at a height corresponding to about 100% from the bottom of the side well 120, i.e., the uppermost portion of the sidewall 120, an input amount of raw material may be increased, and the gases may be very well discharged.

The exhaust passage 142 may be provided in plurality to further smoothly discharge the gases. In FIG. 2, the exhaust passage 142 having a rectangular shape is illustrated as an example in consideration of exhaust efficiency and gas discharge characteristics. However, the exhaust passage 142 may have various shapes such as an inverted triangular shape, a semicircular shape, an inverted trapezoid shape, a circular shape, and a geometrical shape, except the rectangular shape. The present disclosure is not limited to its space. For example, the exhaust passage 142 may have all shapes capable of serving as an exhaust passage.

Figure 4:
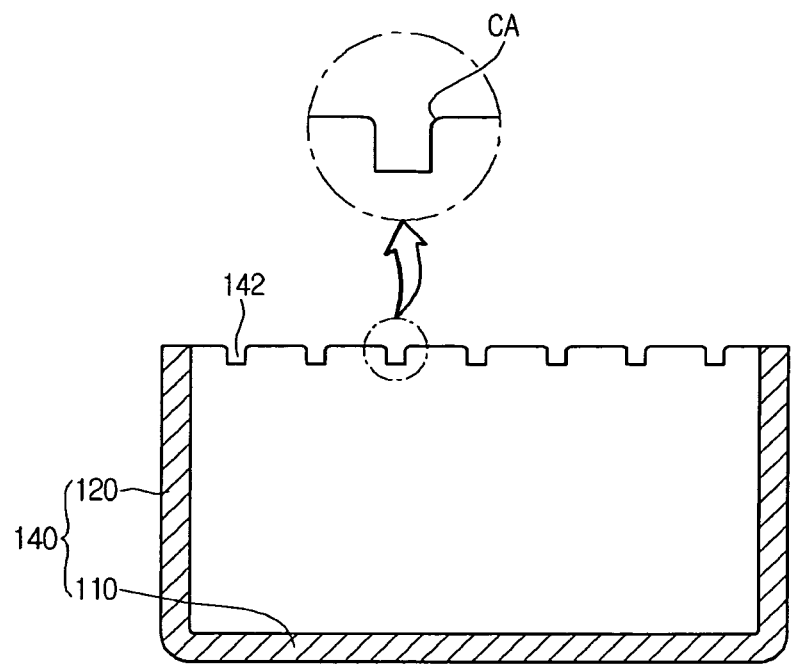
FIG. 4 is a sectional view illustrating a modified example of the heat treatment container part according to the first embodiment.

Although the exhaust passage 142 and the sidewall 120 are perpendicular to each other in FIG. 2, the present disclosure is not limited thereto. As shown in FIG. 4 as a modified example, a connection portion CA between the exhaust passage 142 and the sidewall 120 may have a rounded shape. Thus, a friction force between the heat treatment container 140 and the cover member (see reference numeral 130 of FIG. 2, and hereinafter, referred to as the same reference numeral) may be reduced to prevent the exhaust passage 142 from being damaged.

Figure 6:
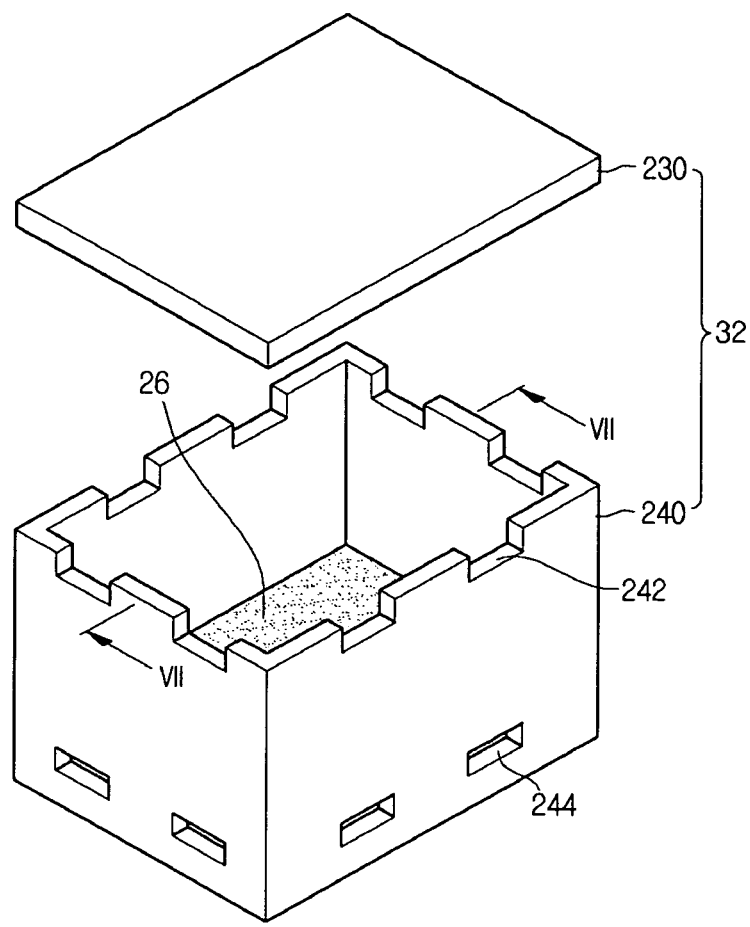
FIG. 6 is a perspective view of a heat treatment container part according to a second embodiment.

Although the heat treatment container 140 has a circular plane shape to minimize a thermal stress applied to the heat treatment container 140 in the current embodiment, the present disclosure is not limited thereto. For example, the heat treatment container 140 may have various polygonal shapes. The heat treatment container having a plane shape is illustrated in FIG. 6.

Figure 5:
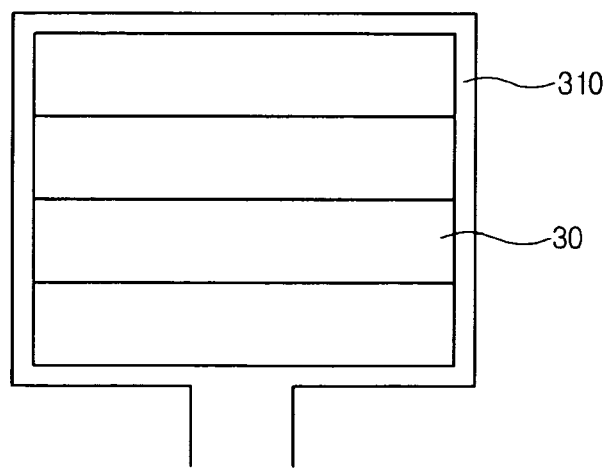
FIG. 5 is a schematic sectional view illustrating another modified example of the heat treatment container part according to the first embodiment.

Also, as shown in FIG. 5 as a modified example, the heat treatment container part 30 may be provided in plurality. An outside member 310 surrounding the plurality of heat treatment container parts 30 may be disposed outside the plurality of heat treatment container parts 30. The heat treatment container part 30 may include the heat treatment container part 30 as shown in FIGS. 2 and 3. An exhaust passage (not shown) may be defined in the outside member 310.

For example, the vacuum heat treatment apparatus 100 may be used as a silicon carbide manufacturing apparatus in which a mixed raw material containing a carbon source and a silicon source is heated to manufacture silicon carbide.

That is, the mixed raw material of the carbon source and the silicon source is put into the heat treatment container part 30 of the vacuum heat treatment apparatus 100 to heat the mixed raw material using the heating member 40.

The silicon source according to the current embodiment may include various materials capable of providing silicon. For example, the silicon source may include silica. Also, silicon powder, silica sol, silica gel, or quartz powder may be used as the silicon source. However, the present disclosure is not limited thereto. For example, an organic silicon compound containing silicon may be used as the silicon source.

The carbon source may include a solid carbon source or an organic carbon compound.

Graphite, carbon black, carbon nano tube (CNT), or fullerene ($C_{60}$) may be used as the carbon source.

The organic carbon compound may include penol, franc, xylene, polyimide, polyunrethane, polyvinyl alcohol, polyacrylonitrile, or poly vinyl acetate. In addition, cellulose, sugar, pitch, or tar may be used as the organic carbon compound.

The silicon source and the carbon source are mixed with each other. Here, when the solid carbon source is used, a mass ratio of the silicon source and the carbon source may be in the range of about 1:1 to about 4:1.

Also, when the organic carbon compound is used as the carbon source, the carbon source having twice as many carbons as the solid carbon source is required. However, an amount of carbon may be different somewhat according to a generation amount of carbon generated during a carbonization process. When the organic carbon compound is used as the carbon source, the mixture of the silicon source and the carbon source is heated to carbonize the mixture. The carbonization process may be performed at a temperature of about 700° C. to about 1,200° C., and particularly, about 900° C. to about 1,100° C. However, when the organic carbon compound is not used as the carbon source, the carbonization process may be omitted.

Thereafter, when the mixture of the carbon source and the silicon source is put into the heat treatment container part 30 to heat the mixture, the silicon carbide is manufactured by carbothermal reaction according to following reaction formulas 1 to 3.

$$SiO_2(s) + C(s) \rightarrow SiO(g) + CO(g) \quad \text{[Reaction Formula 1]}$$

$$SiO(g) + 2C(s) \rightarrow SiC(s) + CO(g) \quad \text{[Reaction Formula 2]}$$

$$SiO_2(s) + 3C(s) \rightarrow SiC(s) + 2CO(g) \quad \text{[Reaction Formula 3]}$$

The heating process may be performed under argon (Ar) atmosphere or vacuum atmosphere. A vacuum level may be in the range of greater than about 0.2 torr and less than about 0.5 torr, and particularly, greater than about 0.3 torr and less than about 0.1 torr. When the vacuum level is less than about 0.3 torr, since a mechanical load of a product apparatus is increased and thus an additional device is required, the maintenance and repair of the apparatus may be difficult and manufacturing costs may be increased.

A heating temperature may be in the range of about 1,300° C. to about 1,900° C., and particularly, about 1,600° C. to about 1,900° C. Here, a heating time may be about 3 hours, but is not limited thereto.

As described above, the vacuum heat treatment apparatus 100 according to the current embodiment may be used for manufacturing the silicon carbide, but it not limited thereto. For example, the vacuum heat treatment apparatus 100 may be used for manufacturing various materials in which heat treatment for synthesis is required.

Hereinafter, the present disclosure will be described in more detail through a method for manufacturing the silicon carbide according to a manufacturing example and a comparative example. The manufacturing example is merely an exemplary embodiment for more detailedly explaining the present disclosure. Thus, the present disclosure is not limited to the manufacturing example.

Manufacturing Example 1

About 80 g of a mixed raw material (mixed raw material of 40 parts by weight of fumed silica having a mean diameter of about 40 nm and 18 parts by weight of carbon block) was put into a heat treatment container having a circular plane shape, a diameter of about 100 mm, and a height of about 100 mm to thermally treat the mixed raw material at a temperature of about 1,700° C. with a vacuum level of about 0.1 torr to about 0.5 torr for about 3 hours, thereby manufacturing silicon carbide powder. Four exhaust passages, each having a semicircular shape and a diameter of about 3 mm, were defined at a height corresponding to about 100% from the bottom of a sidewall of the heat treatment container.

Manufacturing Example 2

Silicon carbide powder was manufactured using the same method as Manufacturing Example 1 except that an exhaust passage has a regular square with a length of about 3 mm and a breadth of about 3 mm.

Comparative Example 1

Silicon carbide powder was manufactured using the same method as Manufacturing Example 1 except that an exhaust passage has a circular shape with a diameter of about 3 mm and is defined at a height corresponding to about 80% from the bottom of a sidewall and about 65 g of a mixed raw material is put.

The silicon carbide powder according to Manufacturing Examples 1 and 2 and Comparative example 1 was recovered to measure a recovery rate (g/L) and impurity contents (ppm). The measured results were shown in Table 1.

TABLE 1

|  | Manufacturing Example 1 | Manufacturing Example 1 | Comparative Example |
|---|---|---|---|
| Recovery Rate | 25.5 | 25.2 | 20.7 |
| Ca content | 0.5 | 0.01 | 1 |
| Na content | 0.01 | 0.01 | 0.5 |
| K content | 0.01 | 0.01 | 0.5 |
| Al content | 0.5 | 0.2 | 1 |
| Cr content | 0.1 | 0.1 | 0.1 |
| Fe content | 0.1 | 0.1 | 0.1 |
| Ni content | 0.1 | 0.1 | 0.5 |
| Cu content | 0.1 | 0.1 | 0.1 |

Referring to Table 1, the recovery rates of the silicon carbide powder according to Manufacturing Examples 1 and 2 were about 25.5 g/L and 25.2 g/L, respectively. Thus, it is seen that the recovery rates of the silicon carbide powder according to Manufacturing Examples 1 and 2 are superior when compared to that (about 20.7 g/L) of the silicon carbide powder according to Comparative Example 1. This is done because the exhaust passages according to manufacturing Examples 1 and 2 can be defined at relatively high positions to put a large amount of the raw material into the container.

Also, according to Manufacturing examples 1 and 2, it is seen that the impurity contents, i.e., the contents of Ca, Na, K, Al, and Ni are high when compared to those according to Comparative Example 1. This is done because gases can be quickly discharged.

Hereinafter, a heat treatment container part according to another embodiment will be described with reference to FIGS. 6 to 8. Detailed descriptions with respect to the same constitution as that of the above-described embodiment will be omitted, and only different points will be described in detail.

A heat treatment container part of a vacuum heat treatment apparatus will not be described with reference to FIGS. 6 and 7. FIG. 6 is a perspective view of a heat treatment container according to a second embodiment, and FIG. 7 is a sectional view taken along line VII-VII of FIG. 6.

Figure 7:
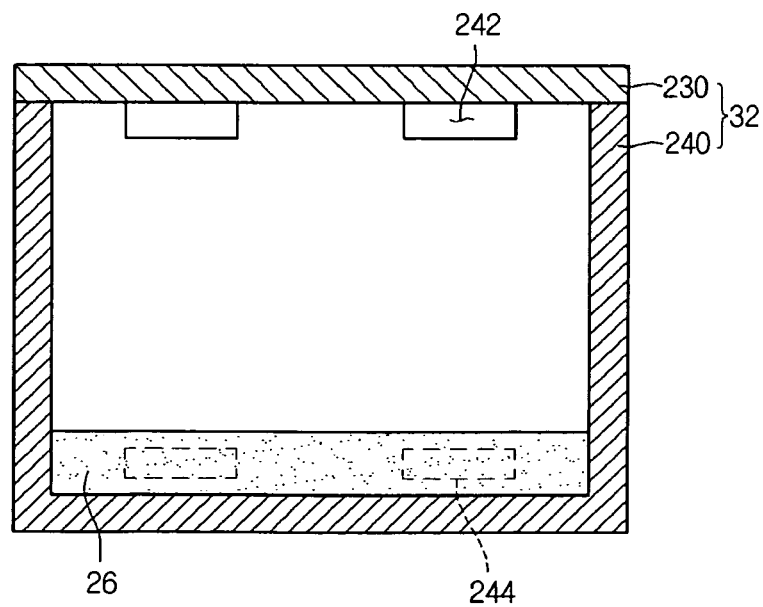
FIG. 7 is a sectional view taken along line VII-VII of FIG. 6.

Referring to FIGS. 6 and 7, a heat treatment container part 32 may include a heat treatment container 240 having a space therein and one opened side and a cover member 230 covering the heat treatment container 240. The heat treatment container part 32 may be formed of a material bearing at a high temperature, e.g., graphite.

The inner space in which a reaction raw material is filled is defined in the heat treatment container 240. An upper exhaust passage 242 may be defined in a portion of the heat treatment container 240 adjacent to the cover member 230. Also, a lower exhaust passage 244 may be defined in a lower portion of a sidewall of the heat treatment container 240, i.e., a portion adjacent to a bottom surface of the heat treatment container 240. A reaction gas during heat treatment or an unreacted gas generated may be discharged through the upper exhaust passage 242 and the lower exhaust passage 244.

According to the current embodiment, the upper and lower exhaust passages 242 and 244 may be provided to smoothly discharge the gases. Also, the gases may be uniformly discharged through upper and lower sides of the heat treatment container 240. Thus, a material manufactured in the vacuum heat treatment apparatus may be improved in quality and have uniform particle sizes.

Here, the upper exhaust passage 242 and the lower exhaust passage 244 may be disposed at positions corresponding to each other to realize more smooth gas flow.

A porous member 26 is disposed inside the heat treatment container 240, i.e., a lower portion of the heat treatment container 240. The porous member 26 may be disposed to block the lower exhaust passage 244, thereby preventing the raw material disposed within the heat treatment container 240 from leaking to the outside and allowing the gases to smoothly flow through pores of the porous member 26.

The porous member 26 may have a thickness equal to or thicker than that of the lower exhaust passage 244 to effectively prevent the raw material from leaking to the outside.

The porous member 26 may contain various materials capable of bearing at a high temperature. For example, the porous member 26 may contain graphite.

Although the heat treatment container 240 has a square plane shape in the current embodiment, the current embodiment is not limited thereto. For example, the heat treatment container 240 may have various polygonal shapes. Also, as shown as a modified example in FIG. 8, the heat treatment container part 34 may have a rounded plane shape. This will be described with reference to FIG. 8.

Figure 8:
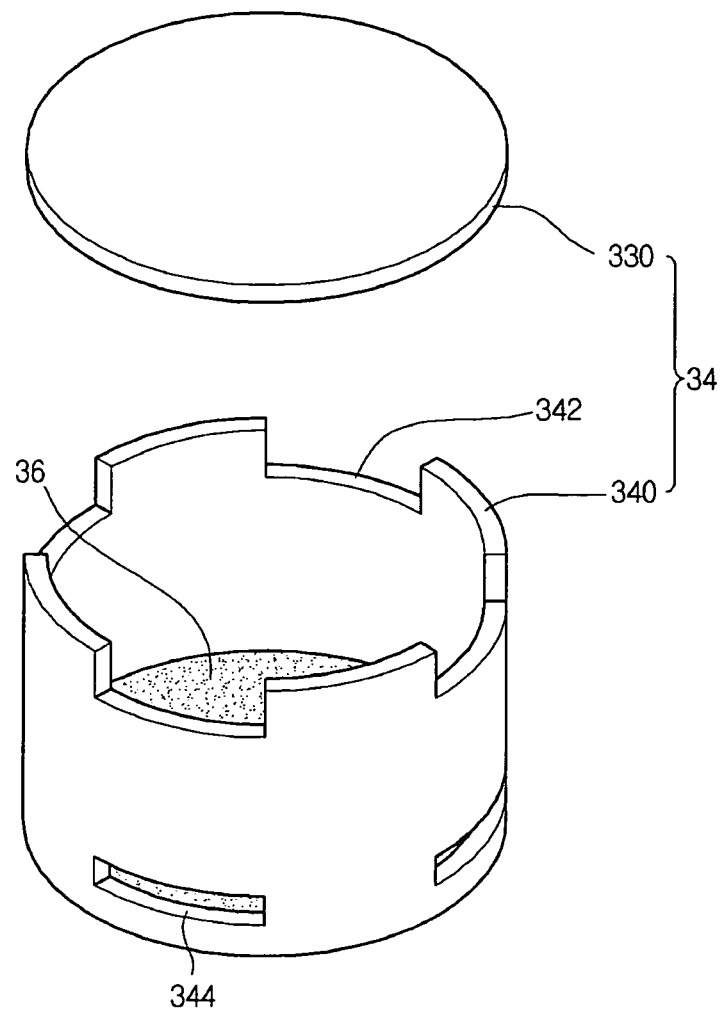
FIG. 8 is a perspective view of a modified example of the heat treatment container part according to the second embodiment.

Referring to FIG. 8, the heat treatment container part 34, i.e., the heat treatment container 340 and the cover member 330 may have rounded plane shapes, respectively. Thus, a force applied to the heat treatment container 340 may be minimized using an orientation between thermal stresses applied to the heat treatment container 340. Accordingly, it may prevent the heat treatment container 340 from being deformed and damaged.

Here, when the heat treatment container 340 has a circular or oval plane shape, a force applied to the heat treatment container 340 may approach nearly zero.

According to a modified embodiment, an upper exhaust passage 342 and a lower exhaust passage 344 may be provided in upper and lower portions of the sidewall of the heat treatment container 340 to realize a smooth gas flow. Also, a porous member 36 may be disposed at a lower portion of the heat treatment container 340 to prevent the raw material from be separated and maintain the smooth gas flow. Since these detailed descriptions are equal or similar to those of FIGS. 6 and 7, their detailed descriptions will be omitted.

According to the current embodiment and the modified embodiment, as shown in FIG. 5, a plurality of heat treatment container parts 320 and 340 including heat treatment containers 240 and 340 and cover members 230 and 330 may be stacked with each other, and an outside member (see reference numeral 310 of FIG. 5, and hereinafter, referred to as the same reference numeral) may surround the plurality of heat treatment container parts 320 and 340. A exhaust passage (not shown) may be defined in the outside member 310.

Hereinafter, the present disclosure will be described in more detail through a method for manufacturing the silicon carbide according to a manufacturing example and a comparative example. The manufacturing example is merely an exemplary embodiment for more detailedly explaining the present disclosure. Thus, the present disclosure is not limited to the manufacturing example.

Manufacturing Example 3

A mixed raw material (mixed raw material of $SiO_2$ and carbon black) was put into a heat treatment container having a circular plane shape, a diameter of about 500 mm, and a height of about 250 mm to thermally treat the mixed raw material at a temperature of about 1,800° C. for about two hours under an argon gas atmosphere, thereby manufacturing silicon carbide powder. Exhaust passages having the same size as each other were defined in upper and lower portions of the heat treatment container.

Comparative Example 2

Silicon carbide powder was manufactured using the same method as Manufacturing Example 3 except that an exhaust passage is defined in only an upper portion of a heat treatment container.

The silicon carbide powder manufactured at the upper and lower portions of the heat treatment container according Manufacturing Example 3 and Comparative example 2 was picked to measure particle sizes. The measured results were shown in Table 2.

TABLE 2

|  | Upper Partical Size [μm] | Lower Partical Size [μm] |
| --- | --- | --- |
| Manufacturing Example 3 | 1.4 | 1.2 |
| Comparative Example 2 | 1.4 | 0.6 |

Referring to Table 2, it is seen that the upper particle size and the lower particle size within the heat treatment container are similar to each other in Manufacturing Example 3, but are significantly different from each other in Comparative example 2. That is, according to Manufacturing Example 3, it is seen that the manufactured material has uniform particle sizes.

Features, structures, and effects described in the above embodiments are incorporated into at least one embodiment of the present invention, but are not limited to only one embodiment. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

The invention claimed is:

1. A heat treatment container of a vacuum heat treatment apparatus for manufacturing silicon carbide, the heat treatment container comprising:
A bottom; and
A sidewall,
A heating member,
Wherein an exhaust passage is defined in the sidewall,
Wherein the exhaust passage comprises:
A plurality of upper exhaust passages defined in an uppermost portion of the sidewall, and a plurality of lower exhaust passages defined in a lower portion of the sidewall;
Wherein the plurality of upper exhaust passages are disposed bordering a top edge of the sidewall;
Wherein each of the plurality of upper exhaust passages has a corresponding lower exhaust passage of the plurality of lower exhaust passages in a vertical direction along the sidewall;
Wherein a porous member is disposed inside the heat treatment container;
wherein a height of the porous member is equal to or greater than heights of the lower exhaust passages;
Wherein a connection portion between the plurality of upper exhaust passages and the sidewall has a rounded shape;
Wherein the heat treatment container has a space, one open side, and a cover member covering the open side;
Wherein the open side is at top of the heat treatment container;
Wherein the connection portion makes contact with the cover member,
Wherein the space is formed by the bottom and the sidewall integrally connected to the bottom,
Wherein the bottom is plate shaped,
Wherein the porous member is disposed only at a lower portion of the heat treatment container,
Wherein the porous member is disposed only at a position corresponding to the lower exhaust passages, and
Wherein the porous member is configured to block the lower exhaust passages such that raw material within the heat treatment container is inhibited from leaking,
Wherein the heat treatment container comprises graphite, and
Wherein the heating member applies a voltage to the graphite to generate heat.

2. The heat treatment container of claim 1, wherein each of the plurality of upper exhaust passages has one of a rectangular shape, an inverted triangular shape, a semicircular shape, an inverted trapezoid shape, and a circular shape.

3. The heat treatment container of claim 1, wherein the porous member comprises graphite.

4. The heat treatment container of claim 1, wherein the heat treatment container has a polygonal plane shape or a circular plane shape.

5. The heat treatment container of claim 1, wherein the porous member has a thickness equal to or greater than that of each of the lower exhaust passages.

6. A vacuum heat treatment apparatus for manufacturing silicon carbide, the vacuum heat treatment apparatus comprising:
A chamber;
An insulating member disposed inside the chamber;
A heat treatment container disposed within the insulation member; and
A heating member;
Wherein the heat treatment container comprises,
A bottom,
A sidewall, and
An exhaust passaged defined in the sidewall,
Wherein the exhaust passage comprises:
A plurality of upper exhaust passages defined in an uppermost portion of the sidewall, and
A plurality of lower exhaust passages defined in a lower portion of the sidewall;
Wherein the plurality of upper exhaust passages are disposed bordering a top edge of the sidewall;
Wherein each of the plurality of upper exhaust passages has a corresponding lower exhaust passage of the plurality of lower exhaust passages in a vertical direction along the sidewall;
Wherein a porous member is disposed inside the heat treatment container;
Wherein a height of the porous member is equal to or greater than heights of the lower exhaust passages;
Wherein a connection portion between the plurality of upper exhaust passages and the sidewall has a rounded shape;
Wherein the heat treatment container has a space, one open side, and a cover member covering the open side;
Wherein the open side is at a top of the heat treatment container; and
Wherein the connection portion makes contact with the cover member,
Wherein the space is formed by the bottom and the sidewall being integrally connected to the bottom,
Wherein the bottom is formed with a plate shape,
Wherein the porous member is disposed only at a lower portion of the heat treatment container,
Wherein the porous member is disposed only at a position corresponding to the lower exhaust passages, and
Wherein the porous member is configured to block the lower exhaust passages such that raw material within the heat treatment container is inhibited from leaking,
Wherein the heat treatment container comprises graphite, and
Wherein the heating member applies a voltage to the graphite to generate heat.

7. The vacuum heat treatment apparatus of claim 6, wherein each of the plurality of upper exhaust passages has one of a rectangular shape, an inverted triangular shape, a semicircular shape, an inverted trapezoid shape, and a circular shape.

8. The vacuum heat treatment apparatus of claim 6, wherein the porous member comprises graphite.

9. The vacuum heat treatment apparatus of claim 6, wherein the heat treatment container has a polygonal plane shape or a circular plane shape.

10. The vacuum heat treatment apparatus of claim 6, wherein an atmosphere gas is injected into the chamber through an atmosphere gas supply pipe, wherein the atmosphere gas comprises an inert gas including argon or helium.

11. The vacuum heat treatment apparatus of claim 6, wherein the insulating member comprises graphite.

12. The vacuum heat treatment apparatus of claim 6, wherein the heating member for heating the heat treatment container is disposed between the insulating member and the heat treatment container.

13. The vacuum heat treatment apparatus of claim 6, wherein the exhaust passage is defined between a height corresponding to 90% from the bottom and a height corresponding to 100% from the bottom.

14. The vacuum heat treatment apparatus of claim 6, wherein the porous member has a thickness equal to or greater than that of each of the lower exhaust passages.

15. The vacuum heat treatment apparatus of claim 6, wherein the heat treatment container and the cover member have a corresponding shape.

\* \* \* \* \*